Jan. 1, 1929.

E. E. KINSEY 1,697,069

GATE AND OPERATING MEANS THEREFOR

Filed Nov. 9, 1927   2 Sheets-Sheet 1

Inventor
E. E. Kinsey

By Lacey & Lacey, Attorneys

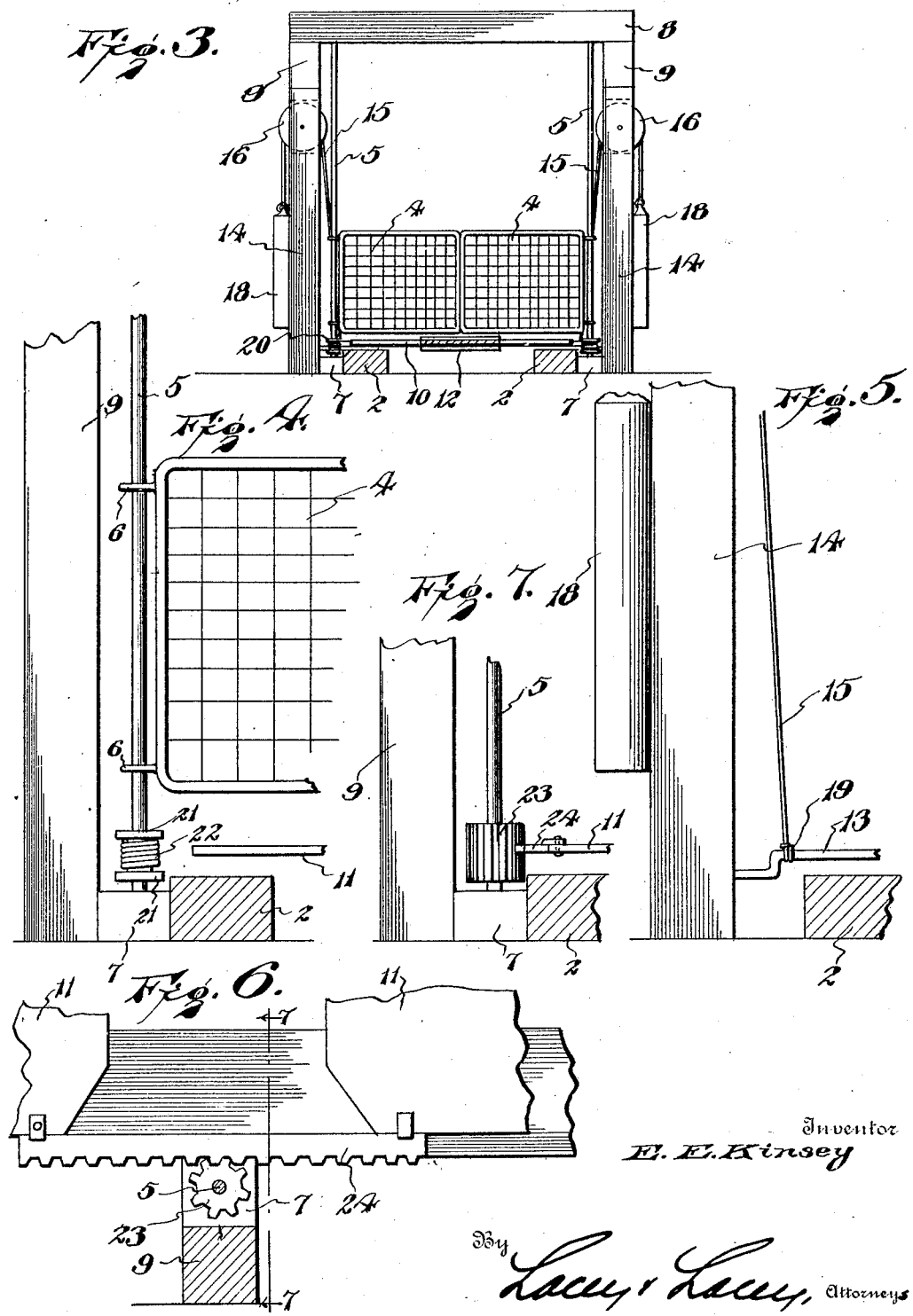

Patented Jan. 1, 1929.

1,697,069

UNITED STATES PATENT OFFICE.

EDMOND E. KINSEY, OF SAN ANGELO, TEXAS, ASSIGNOR OF ONE-HALF TO JOHN FINDLATER, OF SAN ANGELO, TEXAS.

GATE AND OPERATING MEANS THEREFOR.

Application filed November 9, 1927. Serial No. 232,136.

This invention relates to an improved gate and actuating means therefor and one object of the invention is to provide a gate of the type used upon farms to close a road or driveway, and operating means adapted to be actuated by an automobile or other vehicle approaching the gate and cause the gate to be swung open and remain open until the vehicle has passed the gate.

Another object of the invention is to so mount a platform constituting a part of the operating means for the gate, that a vehicle moving onto the platform will cause the platform to swing longitudinally and downwardly to swing the gate open and the weight of the vehicle retain the platform depressed with the gate open until the vehicle moves off of the platform after passing through the gateway.

Another object of the invention is to yieldably retain the platform and rocker shafts which carry the same in a raised position so that when the vehicle moves off of the platform it will return to its normal position and cause the gate to be closed.

Another object of the invention is to insure opening and closing of the gate when the platform is being depressed by a vehicle moving thereon or returning to its normal position after the vehicle has moved off of the platform.

Another object of the invention is to provide an improved track extending below the platform and constituting means to allow a vehicle to easily move onto or off of the platform and also constitute means to support the platform when lowered and prevent it from being damaged by the weight of a vehicle.

The invention is illustrated in the accompanying drawings, in which:

Figure 3 is a view showing the gate and operating means in end elevation.

Figure 4 is an enlarged fragmentary view showing the manner in which the gate is pivotally mounted.

Figure 5 is a fragmentary view illustrating the means for normally retaining the platform in an elevated position.

Figure 6 is a fragmentary view illustrating a modified means for transmitting motion from the platform to a gate.

Figure 7 is a sectional view taken on the line 7—7 of Figure 6.

Figure 2:
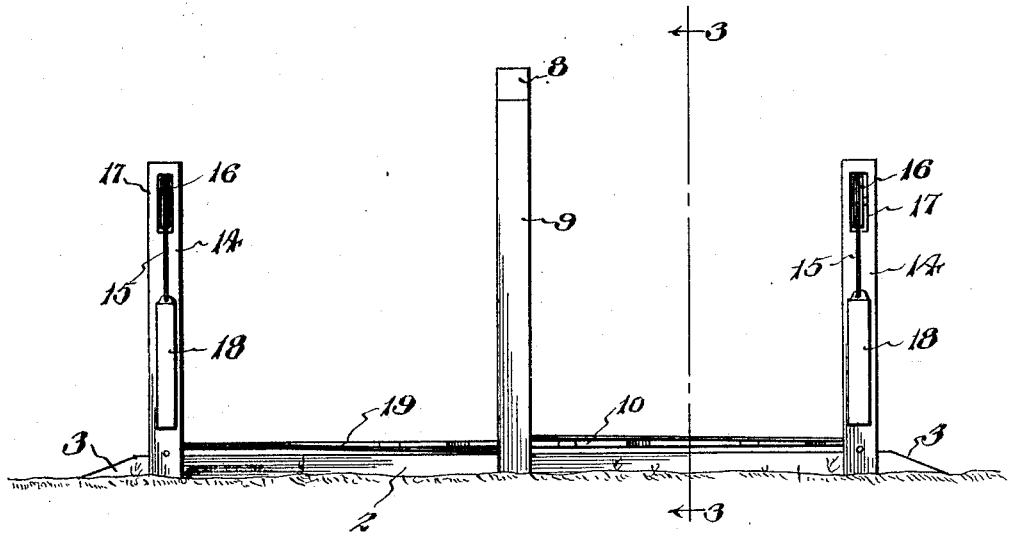
Figure 2 is a side elevation of the gate and operating means.

The improved gate and operating means constituting the subject matter of this invention includes a track extending longitudinally of a roadway indicated by the numeral 1. This track consists of rails 2 which extend longitudinally of the road or driveway adjacent opposite sides thereof and at their ends are formed with sloping faces 3 so that the wheels of an automobile or other vehicle may easily move onto or off of the rails. These rails may consist of wood, metal, cement or any other material desired, and project upwardly from the surface of the road or driveway, as shown in Figure 2 of the drawings.

In the preferred embodiment of the invention, two gates are employed, although one gate of sufficient length to extend the full width of the road may be used if so desired. These gates are indicated by the numeral 4 and are hingedly mounted by rods 5 which extend vertically and pass through eyes 6 carried by the gates. These eyes are rigidly secured to the rods in any desired manner so that when the rods are rotated, swinging movement will be imparted to the gates to open and close the same. At their lower ends the rods are rotatably mounted in blocks 7 disposed at opposite sides of the track intermediate the ends thereof and the upper ends of the rods are journaled in a cross bar 8, the ends of which are supported upon standards 9. It will thus be seen that the gates are hingedly mounted by means of a frame disposed vertically in straddling relation to the driveway and beneath which the automobile passes.

The platform 10, which is preferably formed of thick sheet metal of sufficient strength to prevent it from being easily bent out of shape, extends longitudinally above the track and is of sufficient width to rest upon the rails when in a lowered position. In the preferred construction, the sheet of metal from which the platform is formed is cut to provide side arms 11 to rest upon the rails, thereby providing a platform which will be of sufficient width to engage the rails but, at the same time, light in weight. If so desired, the platform may consist of a longitudinally extending strip of metal having cross strips secured thereto to provide the side arms. The ends of the platform are rolled or otherwise provided with bearings 12 which loosely receive crank shafts 13 and the ends of these crank shafts, which are formed as shown in Figure 5, are journaled in posts 14 erected vertically at opposite sides of the roadway and adjacent opposite ends of the track. Chains or cables 15 are secured adjacent the ends of each crank shaft, as shown in Figure 5, and these cables extend upwardly and after being trained over the pulley wheels 16 rotatably mounted in openings or passages 17 formed near the upper ends of the posts, have their outer end portions extended downwardly and engaged with weights 18 of sufficient weight to normally retain the crank shafts and platform swung upwardly. Therefore, the platform will be normally disposed in spaced relation to the tracks but may be swung downwardly into engagement with the tracks and have movement longitudinally of itself while swinging either downwardly or upwardly.

Figure 1:
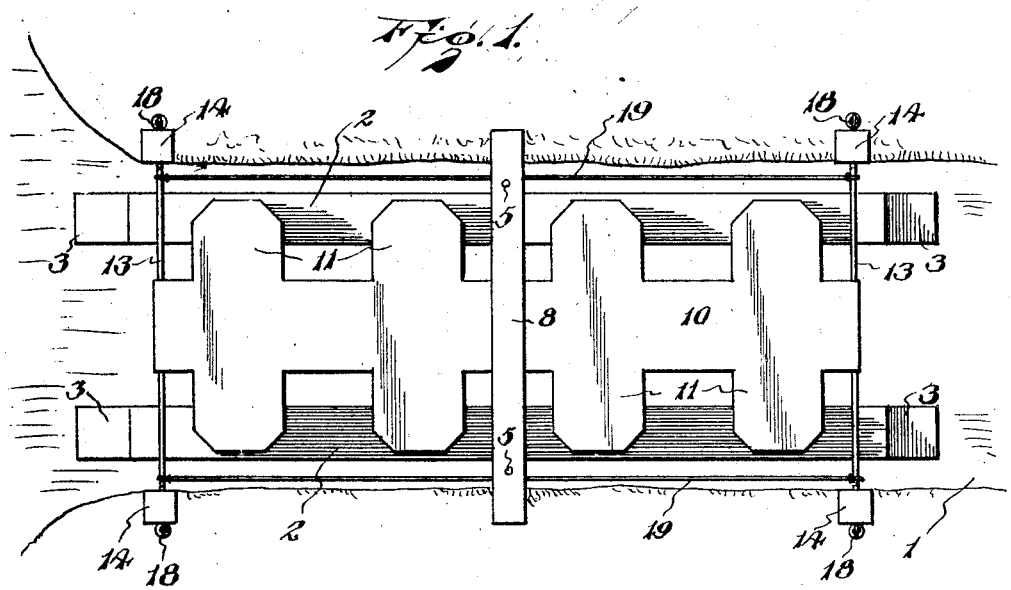
Figure 1 is a top plan view of the improved gate and operating means therefor.

Movement of the platform is to be converted into rotary movement for the rods 5 and in order to do so I preferably employ cables 19 and drums 20. The drums are rigidly carried by the rods 5 near their lower ends and, if so desired, may merely consist of upper and lower discs 21 secured to the rods in vertical spaced relation to each other, as seen in Figure 4. The cables 19 are wrapped about the drums, as shown at 22 in Figure 4, and have their end portions extending from the drums longitudinally of the tracks and secured to the crank shafts 13 adjacent the lower ends of the cables 15. From an inspection of Figure 1, it will be readily seen that when the platform is moved longitudinally in either direction, a pulling action will be exerted upon the cables and as the cables are wound about the drums, movement of the cables will cause the rods 5 to be rotated and swinging movement imparted to the gates.

Instead of employing the drums and cables, I may employ other means to impart rotary motion to the rods 5. A substitute means is illustrated in Figures 6 and 7 of the drawings, and referring to these figures it will be seen that I may employ gears 23 which are rigidly secured upon the rods near their lower ends and rack bars 24 extending longitudinally of the platform at opposite sides thereof and firmly secured to the side arms of the platform. It will be readily seen that when the platform moves longitudinally the racks, by their engagement with the teeth of the gears, will impart rotary motion to the rods and the gates will be opened or closed accordingly to the direction in which the platform moves.

When the gate is in operation, a vehicle approaching the gate will move onto the ends of the rails and, as its front wheels strike the adjacent crank shafts they will swing the shafts downwardly so that the wheels may pass onto the platform. Downward movement of the platform, which will also impart a longitudinal movement to it, will cause the gates to open and they will be held open by the weight of the vehicle upon the platform. Since the weight of the vehicle retains the platform lowered the gates will remain open until the vehicle has passed through the gateway and off of the other ends of the rails. As soon as the rear wheels move off of the platform the weights, by drawing upon the cables 15, will swing the crank shafts upwardly and move the platform longitudinally to its original position. During this movement the rods 5 will be again rotated but in a reverse direction to the first rotation and the gates will be closed. It will thus be seen that the gates, which normally remain closed, will be opened as the vehicle moves onto the platform in either direction, and will remain open until the vehicle has passed through the gateway and off of the platform. When the gears and racks shown in Figures 6 and 7, are employed, it is necessary to have the gears of sufficient depth to prevent danger of the racks moving out of engagement with them during vertical movement of the platform.

Having thus described the invention, what I claim is:

1. In a structure of the character described, a platform, rocker shafts carrying said platform and extending transversely thereof and rockably supported to permit longitudinal movement of the platform by a vehicle moving onto the platform, a track extending longitudinally beneath said platform to limit downward movement thereof and support the same when in a lowered position, said track having sloping ends to facilitate movement of a vehicle onto and off the track, a gate support including a vertically extending rod disposed adjacent one side of said platform and rotatably mounted, a gate carried by said rod and adapted to swing over the platform into and out of a closed position when the rod is rotated, a drum carried by said rod, a cable wound upon said drum with its end portions extending from the drum and secured to said rocker shafts whereby movement of the platform and rocking movement of rocker shafts will exert pull upon the cable to rotate the rod and open and close the gate, and means to yieldably retain the platform in a normal position with the gate closed.

2. In a structure of the character described, a platform, rocker shafts carrying said platform and extending transversely thereof and rockably supported to permit longitudinal movement of the platform by a vehicle moving onto the platform, a gate support including a vertically extending rod disposed adjacent one side of said platform and rotatably mounted, a gate carried by said rod and adapted to swing over the platform into and out of a closed position when the rod is rotated, a gear carried by said rod, a rack carried by said platform and extending longitudinally thereof and meshing with said gear to rotate the rod and open and close the gate as the platform is moved, and means to yieldably retain the platform in a normal position with the gate closed.

3. In a structure of the character described, a platform, rocker shafts carrying said platform and extending transversely thereof and rockably supported to permit longitudinal movement of the platform by a vehicle moving onto the platform, a track extending longitudinally beneath said platform to limit downward movement thereof and support the same when in a lowered position, said track having sloping ends to facilitate movement of a vehicle onto and off the track, a gate support including a vertically extending rod disposed adjacent one side of said platform and rotatably mounted, a gate carried by said rod and adapted to swing over the platform into and out of a closed position when the rod is rotated, posts at opposite sides of the platform, guides carried by said posts, cables connected with said rocker shafts and trained about said guides, and weights carried by said cables and exerting a pulling action thereon to yieldably retain the platform and shafts in a normal position with the gate closed.

4. In a structure of the character described, a track, posts at opposite sides of the track and adjacent the ends thereof, rocker shafts extending across said track and journaled in said posts, pulleys carried by said posts, cables connected with said shafts and trained over said pulleys, means for exerting pull upon said cables to yieldably resist downward swinging of the rocker shafts, a platform above said track having its ends pivotally engaged with said rocker shafts and having movement longitudinally of and toward and away from the track when the shafts are rocked, a frame including standards at opposite sides of said track between said posts, rods rotatably carried by said frame and extending vertically between the standards and track, gates rigidly carried by said rods and extending over said platform transversely thereof when closed, and means actuated by the platform to rotate the rods and open and close the gates when the platform is moved.

5. In a structure of the character described, a track, posts at opposite sides of the track, rocker shafts extending across said track and journaled in said posts, means carried by said posts and connected with said rocker shafts to yieldably resist downward swinging movement thereof, said track including rails spaced transversely from each other, a platform extending between and pivotally connected with said rocker shafts and having side portions to rest upon said rails when the platform is moved downwardly, a gate hinged at one side of said track to swing across the platform to open and closed positions, and means actuated by the platform to move said gate.

In testimony whereof I affix my signature.

EDMOND E. KINSEY. [L. S.]